Aug. 16, 1949.

C. A. ADAMS 2,479,053

COPPER-COATED MAGNETIC STEEL YOKE
FOR WELDING APPARATUS
Filed June 22, 1945

Comfort A. Adams
INVENTOR

BY John R. Tarbox
ATTORNEY

Patented Aug. 16, 1949

2,479,053

UNITED STATES PATENT OFFICE 2,479,053

COPPER-COATED MAGNETIC STEEL YOKE FOR WELDING APPARATUS

Comfort A. Adams, Philadelphia, Pa., assignor to The Budd Company, Philadelphia, Pa., a corporation of Pennsylvania Application June 22, 1945, Serial No. 600,869

2 Claims. (Cl. 29—196.3)

This invention relates to electrical equipment utilizing large alternating currents and has special application to welding apparatus.

In resistance welding and particularly in portable equipment, it is customary to form the apparatus with a U-shaped yoke having one welding electrode fixed at one yoke terminal and the other co-acting electrode slidably attached to the other yoke terminal. The electric current cables are usually connected directly to the upper end of the slidable electrode and, by means of a separate conductor passing through or attached to the yoke, to the co-acting fixed electrode. The conductor to the fixed electrode is copper since, because of the exceedingly high current densities involved, the use of other materials would be inefficient. It has been suggested that unitary combinations of steel and low resistance metal, such as copper, be used to form a joint path for the current, but in such combinations either the proportion of steel used is large or the steel is non-magnetic to reduce the impedance.

The primary object of the present invention is to provide a conductor, usable with high alternating currents, in which the current is confined almost completely to a surface layer of a conductor of a material having relatively high electrical conductivity.

Another object of the invention is to provide a conductor having particular utility in connection with welding equipment in which the necessity of fluid cooling is obviated.

Still another object of the invention is to provide a conductor for high density alternating currents which permits employment of magnetic steel as a structural element without substantial increase in impedance to current flow. In fact the reactance is exceptionally low because the current is confined to the low resistance skin.

Other objects associated with the specific embodiment of the invention will become apparent from the following description.

Figure 1:
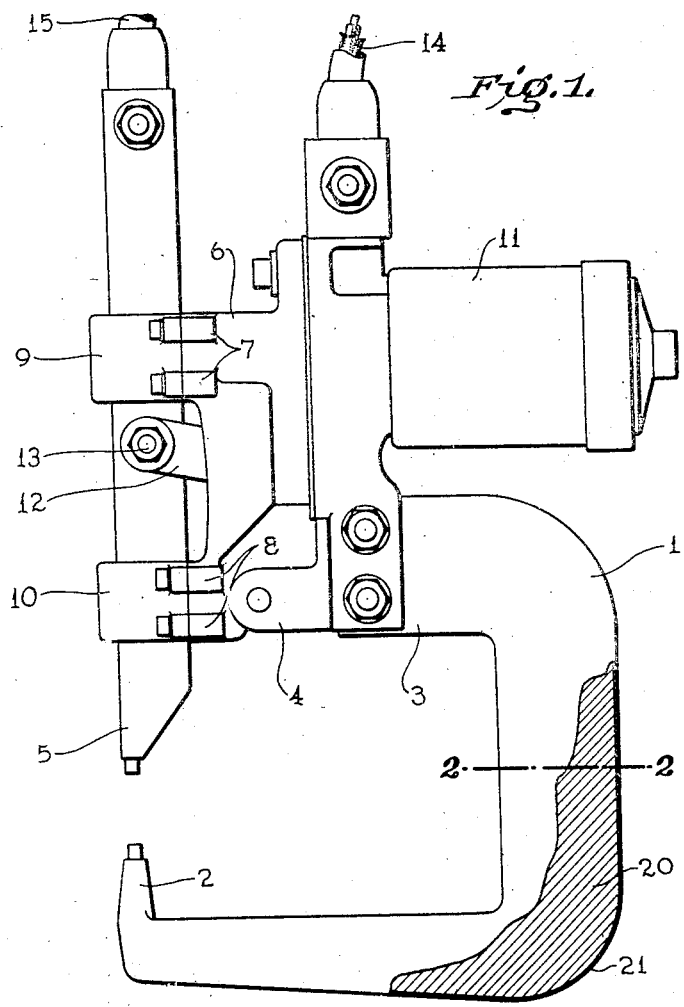
Figure 1 is a view of welding apparatus provided with a yoke in accordance with the invention.

Figure 1 of the drawing illustrates a portable resistance welder provided with a yoke 1 having a fixed electrode 2. The other end 3 of the yoke is provided with support means 4 on which is supported the mechanism for movably supporting the electrode 5 so as to permit movement of this electrode into operating engagement with the fixed electrode 2. This mechanism includes a frame 6 bolted to the support member 4 of the yoke and having lugs 7 and 8 by means of which slide elements 9 and 10 for the upper electrode are secured.

Means for moving the electrode 5 in the slides 9 and 10 comprise a fluid motor 11 fixed to the frame 6 and having power connections to a rod 12 pivotally connected to the electrode 5 at 13. Appropriate switch means for operating the motor are provided. The frame 6 at its upper end is connected to one of the current cables 14, the other cable 15 being connected to the upper end of the electrode 5.

Figure 2:
Figure 2 is a cross section taken along lines 2—2 of Figure 1, indicating the surface coating of high electrical conductivity on the structural base material of the yoke.

The yoke 1, as illustrated in Figure 2 is formed of an inner section 20 preferably of carbon steel and an outer thin layer 21 of a good electrical and heat conductor such as copper. This copper may be applied to the steel in any appropriate manner, the applicants preferring to employ copper electrolytically deposited to secure high purity with intimate engagement with the steel core.

The thickness of the copper layer is important in its bearing on the value and utility of this invention. It is desirable for strength that the body of the yoke be made of steel. This is particularly important where the depth of the yoke is large, since with softer metals there would be a pronounced tendency for the arms of the yoke to yield under pressure, setting the electrodes out of alignment, and thus producing deficient welds. Since steel offers a relatively high resistance to current and since moreover carbon steel, being magnetic, develops a considerable impedance to alternating current, it is also desirable that the current be confined, as far as possible, to the copper layer. The applicant has found that if the thickness of the layer be within a range from approximately 4/10 to 8/10 of the skin effect depth for the frequency of the current used, it affords an adequate path for the electric current. The skin depth is a function of the frequency, the magnetic permeability and of the resistivity, and may be expressed as follows:

$$X = \frac{1}{16}\sqrt{\frac{\rho}{\mu f}}$$

where $f$ is the current frequency, $\mu$ is the magnetic permeability, $\rho$ the resistivity of the conductor in absolute electromagnetic units, and $X$ the skin depth in inches. For 60 cycles this depth is approximately 0.35 inch. Since the current is carried by the copper layer, whether or not the steel core is of magnetic or non-magnetic material, is of little consequence, as the amount of current passing through the steel is relatively negligible.

Inasmuch as the current is concentrated in the surface of the yoke, heat is readily radiated, this being aided by the large expanse of conductor surface. Consequently, there is no need for the employment of liquid cooling tubing or other accessory cooling devices. It is pointed out that the entire yoke is coated and not a side or edge. This is important as bearing upon the effectiveness of the circuit.

It is pointed out that the invention is directed to the obtaining of a structurally strong conductor and the reduction as far as possible of the use of the relatively more costly copper conductor and that by utilizing a thin layer of copper on the conductor surface, which in thickness does not exceed a percentage of the skin effect depth of the metal, and which in volume is substantially less than the volume of the steel, this general object may be accomplished.

What is claimed is:

1. A yoke for electrical resistance welding apparatus comprising an elongated metal core element and a metal surface element of electrical resistivity less than that of the core element, completely enclosing said core element, the volume of the surface element in cross section being less than that of the core element and the thickness of the surface element lying within a range of $\frac{1}{10}$ to $\frac{1}{10}$ of the skin effect depth for 60 cycles current frequency.

2. A yoke for electrical resistance welding apparatus comprising a core of magnetic metal, and a coating for the core of non-magnetic metal having a lesser electrical resistivity than the core metal, the volume of the coating metal being less in cross section than that of the core metal and the thickness of the surface element lying within the range of $\frac{1}{10}$ to $\frac{1}{10}$ of the skin effect depth for 60 cycles current frequency.

COMFORT A. ADAMS.

REFERENCES CITED

The following references are of record in the file of this patent:

UNITED STATES PATENTS

| Number | Name | Date |
|---|---|---|
| 293,532 | Smith | Feb. 12, 1884 |
| 1,817,964 | Carlson et al. | Aug. 11, 1931 |
| 2,052,317 | Schelkunoff | Aug. 25, 1936 |
| 2,172,978 | Kirch | Sept. 12, 1939 |
| 2,268,617 | Pierce | Jan. 6, 1942 |
| 2,314,882 | Hensel | Mar. 30, 1943 |
| 2,381,367 | Quayle | Aug. 7, 1945 |